(12) United States Patent
Yoshida et al.

(10) Patent No.: US 7,178,831 B2
(45) Date of Patent: Feb. 20, 2007

(54) GAS GENERATOR

(75) Inventors: Masahiro Yoshida, Himeji (JP); Ryoi Kodama, Himeji (JP); Yoshiyuki Kishino, Himeji (JP)

(73) Assignee: Nippon Kayaku Kabushiki-Kaisha, Tokyo (JP)

( * ) Notice: Subject to any disclaimer, the term of this patent is extended or adjusted under 35 U.S.C. 154(b) by 109 days.

(21) Appl. No.: 10/494,041

(22) PCT Filed: Nov. 15, 2002

(86) PCT No.: PCT/JP02/11930

§ 371 (c)(1),
(2), (4) Date: May 10, 2004

(87) PCT Pub. No.: WO03/042010

PCT Pub. Date: May 22, 2003

(65) Prior Publication Data
US 2004/0262900 A1    Dec. 30, 2004

(30) Foreign Application Priority Data
Nov. 15, 2001    (JP)    ............................. 2001-349608

(51) Int. Cl.
*B60R 21/26*    (2006.01)
(52) U.S. Cl. .................................... 280/741
(58) Field of Classification Search ............... 280/741, 280/740, 736, 742
See application file for complete search history.

(56) References Cited

U.S. PATENT DOCUMENTS

| 3,877,882 | A |   | 4/1975 | Lette et al. |
| 3,972,545 | A |   | 8/1976 | Kirchoff et al. |
| 5,716,072 | A | * | 2/1998 | O'Driscoll ................ 280/740 |
| 6,068,290 | A |   | 5/2000 | Sheng |
| 6,196,583 | B1 | * | 3/2001 | Ruckdeschel et al. ...... 280/736 |
| 6,926,304 | B2 | * | 8/2005 | Miyaji et al. ............... 280/741 |

FOREIGN PATENT DOCUMENTS

| DE | 40 09 551 A1 | 9/1991 |
| DE | 41 21 039 A1 | 1/1993 |
| JP | 7-52748 | 2/1995 |
| JP | 10-181517 | 7/1998 |
| JP | 2000-62564 | 2/2000 |
| JP | 2000-198409 | 7/2000 |
| JP | 2001-270418 | 10/2001 |
| JP | 2002-114126 | 4/2002 |
| JP | 2002-308040 | 10/2002 |
| JP | 2003-11770 | 1/2003 |
| JP | 2003-11771 | 1/2003 |
| JP | 2003-146182 | 5/2003 |
| WO | 00/44593 | 8/2000 |

* cited by examiner

*Primary Examiner*—Faye M. Fleming
(74) *Attorney, Agent, or Firm*—Oblon, Spivak, McClelland, Maier & Neustadt, P.C.

(57) ABSTRACT

A gas generator including a housing, a combustion chamber formed in the housing, the combustion chamber being packed with gas generant to generate high temperature gas by burning and also having a filtering member, an igniter device, secured in the housing, for igniting and burning the gas generant packed in the combustion chamber, and a gas discharge hole, formed in the housing, to communicate between an interior of the housing and an exterior of the same through the combustion chamber and a gas flow pass, wherein a coolant is arranged in the gas flow pass.

12 Claims, 5 Drawing Sheets

GAS GENERATOR

TECHNICAL FIELD

The present invention relates to a gas generator suitably used to expand and inflate an airbag and the like and, more particularly, to a gas generator having a beneficial effect on the cooling of high-temperature gas.

BACKGROUND ART

A gas generator used to expand and inflate the airbag rapidly so as to protect a vehicle occupant from the shock at a car collision is built in an airbag module secured in a steering wheel and an instrument panel. Some gas generators are designed for an air-belt and built in an airbag module arranged in a buckle of a seatbelt. The gas generator operates to ignite an igniter device (squib) by an application of electric current thereto to burn gas generant by the flames from the igniter device, thereby generating a large amount of gas rapidly.

In recent years, in order to increase a degree of freedom in design of an interior of an automobile, limitations are imposed on the shape and size of the gas generator and reduction in size of the gas generator is being increasingly demanded.

In general, the gas generator is designed to cool down high temperature gas generated by the burning of the gas generant by letting the gas pass through a filtering member fitted in the gas generator before discharged. However, along with increasing size reduction of the gas generator, the need arises to reduce thickness of the filtering member itself having the effects on the cooling of the high temperature gas, so it becomes increasingly harder for the filtering member to cool down the gas sufficiently before discharged.

In the light of the problem mentioned above, the present invention has been made. It is an object of the present invention to provide a gas generator that can allow the sufficient cooling of high-temperature gas generated by the burning of the gas generant before discharged from the gas generator, to control the temperature of the discharged gas easily, even when the gas generator is reduced in size.

DISCLOSURE OF THE INVENTION

A gas generator according to the present invention comprises a housing, a combustion chamber formed in the housing, the combustion chamber being packed with gas generant to generate high temperature gas by burning and also having a filtering member, an igniter device, secured in the housing, for igniting and burning the gas generant packed in the combustion chamber, and a gas discharge hole, formed in the housing, to communicate between an interior of the housing and an exterior of the same through the combustion chamber and a gas flow pass, the gas generator further comprising a coolant arranged in the gas flow pass.

The construction above can provide the result that the high temperature gas generated by the burning of the gas generant is cooled down to a satisfactory extent before discharged from the gas discharge hole by the filtering member arranged in the combustion chamber and the coolant arranged in the gas flow pass communicating with the gas discharge hole. Therefore, even when the gas generator is reduced in size, the high temperature gas generated by the burning of the gas generant can be cooled down to a satisfactory extent by the filtering member and the coolant.

In accordance with the second aspect of the invention, there is provided the gas generator according to the first aspect of the invention, wherein the housing has an elongated cylindrical shape, and one end portion of the housing is fitted with the igniter device and a gas discharge cylinder having the gas discharge hole at a tip thereof is formed at the other end portion of the housing.

The construction above can provide the result of providing the gas generator suitably used for an air-belt gas generator for introducing the gas into a seatbelt to expand it.

In accordance with the third aspect of the invention, there is provided the gas generator according to the second aspect of the invention, wherein the igniter device comprises an igniter and a holder for holding the igniter, and the holder holds the igniter and a storage casing for containing enhancer agent to enhance flames from the igniter, the storage casing being formed of iron.

The construction above can provide the result that since the storage casing of the enhancer agent is formed of iron having good heat conducting properties, the thermal energy from the enhancer agent can be effectively transmitted to the gas generant packed in the combustion chamber. Also, since the storage casing formed of iron has a high strength to resist against the heat from the enhancer agent, the storage casing is not broken easily, thus ensuring that the flames spurted out from the plurality of holes formed around the storage casing is transmitted to the gas generant packed in the combustion chamber. Any material is used for the storage casing, as long as it has proper strength. Metals, such as iron, stainless steel, and titanium, may be used, for example. Of these metals, iron is preferably used.

In accordance with the fourth aspect of the invention, there is provided the gas generator according to the second aspect of the invention, wherein the filtering member is disposed in abutment with a supporting member arranged at the other end portion of the housing.

The construction above can provide the result that the filtering member can be prevented from being displaced by the pressure of the gas generated in the combustion chamber, and as such can ensure the passage of the gas generated in the combustion chamber through the filtering member.

In accordance with the fifth aspect of the invention, there is provided the gas generator according to the fourth aspect of the invention, wherein the supporting member comprises a first member having a ring shape, and a plurality of second members each having a bar shape projecting from the first member toward a center thereof, the second member being in abutment with the filtering member.

The construction above can provide the result that even when the filtering member is deformed by the pressure of the gas generated in the combustion chamber, the combustion chamber and the gas flow pass in the gas discharge cylinder can sure be kept in the condition of being communicated with each other. Thus, the gas flow from the combustion chamber to the gas flow pass is prevented from being hindered.

In accordance with the sixth aspect of the invention, there is provided the gas generator according to the second aspect of the invention, wherein a second filtering member is fitted in the gas flow pass at an inside of the gas discharge hole at the tip of the gas discharge cylinder.

The construction above can provide the result that the gas cooled down by the coolant in the gas discharge cylinder can surely be cooled down further. Also, the arrangement of the second filtering member can provide the result that stepwise adjustment of the pressure loss in the interior of the housing can be made by adjusting the thickness of the filtering member and the like. This can produce the advantage of providing controlled gas discharge characteristics for the gas generator easily.

In accordance with the seventh aspect of the invention, there is provided the gas generator according to the second aspect of the invention, wherein a coolant is arranged along an inner wall of the gas discharge cylinder.

The construction above can provide the result that a surface area of the inner wall of the gas discharge cylinder serving as the gas flow pass is increased, so that the high temperature gas generated by the burning of the gas generant is cooled down effectively in the gas discharge cylinder.

In accordance with the eighth aspect of the invention, there is provided the gas generator according to the seventh aspect of the invention, wherein temperature of the gas discharged from the gas discharge hole can be adjusted by adjusting a length of the gas discharge cylinder.

The construction above can provide the result that by adjusting a length of the gas discharge cylinder or a length of the gas flow pass, the surface area of the inner wall of the gas discharge cylinder along which the coolant is arranged is adjusted, so that temperature of the gas discharged from the gas discharge hole is adjusted. Thus, simply by adjusting the length of the gas discharge cylinder, the temperature of the gas discharged can be adjusted.

BRIEF DESCRIPTION OF THE DRAWINGS

FIG. 3(a) to (c) show an example of the embodiment of the storage casing.

FIG. 4(a) shows a plan view of the same, and

FIG. 4(b) a sectional view of the same taken along line A—A of FIG. 4(a).

BEST MODE FOR CARRYING OUT THE INVENTION

Figure 1:
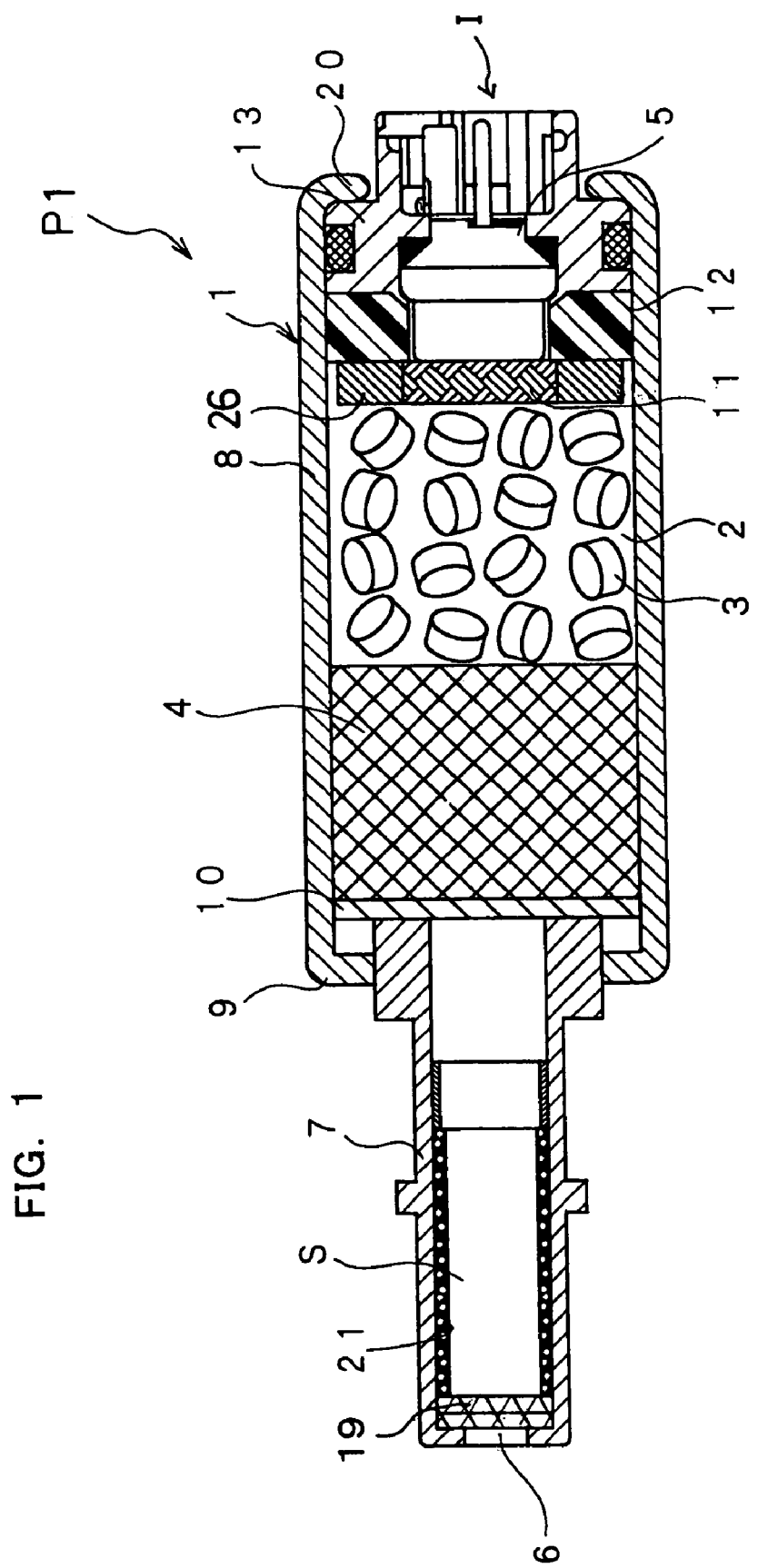
FIG. 1 is a sectional view of a gas generator of a first embodiment of the present invention.

Referring to FIG. 1, a first embodiment of a gas generator according to the present invention will be described. In FIG. 1, the gas generator P1 is mainly designed for expanding a seatbelt of an air-belt, comprising a housing 1 of an elongated outer cylinder 8, an igniter 5 forming an igniter device I secured in an interior of the housing 1 at one end thereof, a combustion chamber 2 formed in the housing 1, gas generant 3 packed in the combustion chamber 2, filtering member 4 fitted in the combustion chamber 2, and a gas discharge cylinder 7 having a gas discharge hole 6 to communicate between an interior of the housing 1 and an exterior of the same. The air-belt is an elongated bag-like mounted in an occupant's seat to expand the seatbelt by introducing clean gas discharged from the gas generator P1 into it.

One end portion of the housing 1 is fitted with an igniter device I comprising an igniter 5 and a holder 13 holding the igniter 5 and closed by it. The holder 13 is fitted in an axial end portion of the outer cylinder 8 and held in place by folding the axial end portion of the outer cylinder 8 inwardly, thereby closing the one end portion of the housing 1.

The housing 1 is provided, at the other end portion 9 thereof, with a gas discharge cylinder 7 having an outer diameter smaller than an outer diameter of the outer cylinder 8 and extending in parallel with an axis of the outer cylinder 8 in a chimney shape. The gas discharge cylinder 7 has the gas discharge hole 6 formed at the tip.

The combustion chamber 2 of the housing 1 contains a supporting member 10 for supporting the filtering member 4, the filtering member 4, the gas generant 3, and cushioning members 11, 12 which are fitted into the combustion chamber 2 from the other end portion 9 of the outer cylinder 8 in this sequence. Further, the holder 13 to which the igniter 5 is fixed by crimping is fitted in the combustion chamber 2. High-temperature gas generated by the burning of the gas generant 3 in the combustion chamber 2 passes through the filtering member 4 and is cooled down in a certain level and also is filtered by the filtering member 4. Thereafter, the gas passes through the gas discharge cylinder 7 and is discharged as clean gas from the gas discharge hole 6. The filtering member 4 may be formed, for example, by a knitted wire sheet, a plain-woven wire sheet, or an aggregation of crimped metal wire rods formed in a cylindrical shape having substantially the same outer diameter as an inner diameter of the outer cylinder 8. The filtering member 4 is secured in place by abutment with the supporting member 10 fitted in the other end portion 9 of the housing 1.

The gas discharge cylinder 7 has a cylindrical coolant 21 fitted therein and extending along an inner wall of the gas discharge cylinder 7 and has the gas discharge hole 6 formed at the tip. The gas discharge hole 6 communicates between the interior of the housing 1 and the exterior of the same through a gas flow path S formed in the interior of the gas discharge cylinder 7. The coolant 21 extending along the inner wall of the gas discharge cylinder 7 creates more surface area of the inner wall of the gas discharge cylinder 7, so that the gas passed through the filtering member 4 from the combustion chamber 2 is cooled down further by the coolant 21. By increasing a length of the gas discharge cylinder 7, more surface area of the inner wall of the gas discharge cylinder 7 is created, so that the gas cooling effect is improved. Thus, by adjusting the length of the gas discharge cylinder or the length of the gas flow path, temperature of the gas discharged from the gas discharge hole 6 at the tip of the gas discharge cylinder 7 can be adjusted. Also, the coolant 21 provides the cooling effect without entailing a pressure loss. Although a commonly used filtering member provides the cooling effect, it has the disadvantage of entailing a pressure loss for providing the cooling effect. The coolant 21 can cover this disadvantage. Specifically, the coolant 21 can drop a maximum pressure without spoiling an initial rise performance of the performances of the inflator.

Also, a second filtering member 19 is fitted in the gas flow path S at the inside of the gas discharge hole 6. The provision of the second filtering member 19 can provide the result that the gas as was cooled in the interior of the gas flow path S is further cooled down immediately before discharged from the gas discharge hole 6. It can also provide the result that stepwise adjustment of the pressure loss in an interior of the housing can be made by adjusting the thickness of the filtering member and the like. This can produce the advantage of providing controlled gas discharge characteristics for the gas generator easily. This second filtering member 19 may be formed, for example, by a knitted wire sheet, a plain-woven wire sheet, or an aggregation of crimped metal wire rods formed into a cylindrical shape, as is the case with the filtering member 4 described above, or by an expanded metal sheet or a punching metal sheet formed into a cylindrical shape. Preferably, the second filtering member 19 has a diameter in the range of 8–12 mm, a weight in the range of 0.7–7.0 g, and a percentage of void in the rage of 36–76%, though these are dependent on the shape of the gas discharge cylinder 7. On the other hand, the filtering member 4 preferably has a diameter in the range of 20–24 mm, a weight in the range of 20–40 g, and a percentage of void in the rage of 38–65%, though these are dependent on the shape of the housing 1.

Also, the gas discharge cylinder 21 provides dust collecting effects (by providing adherence of slags and the like to the inner wall of the gas discharge cylinder 8) even when it is short in length. The longer the gas discharge cylinder 21 is, the more effective are the dust collecting effects. The length of the gas discharge cylinder 21 may be adjusted properly in accordance with a size of the mounting space of the gas generator. This can allow the effective cooling of the gas from the combustion chamber 2 when passing through the gas discharge cylinder 7. It is preferable that the gas discharge cylinder 21 has an inner diameter in the range of 9.05–9.65 mm. Also, the gas discharge cylinder 21 preferably has a length in the range of 10–100 mm.

Any coolant may be used as the coolant 21, as long as it can create more surface area of the interior of the gas flow pass S. The coolant 21 may be formed, for example, by a knitted wire sheet, a plain-woven wire sheet, or an aggregation of crimped metal wire rods formed into a cylindrical shape, as is the case with the filtering member 4 described above, or by an expanded metal sheet or a punching metal sheet formed into a cylindrical shape. The coolant 21 may have an outer diameter to be inserted into the gas discharge cylinder 21. It preferably has the outer diameter of about 9 mm. The larger thickness the coolant 21 has, the more effective are the cooling effects and dust collecting effects. It is preferable, however, that the thickness of the coolant 21 is properly selected not to spoil the initial rise performance of the performances of the inflator, as mentioned above. Specifically, it is preferable that the thickness of the coolant 21 is selected so that a sectional area of an inner diameter portion of the coolant 21 is as large as 1–60%, preferably 10–50%, or further preferably 20–40% of a sectional area of the gas flow pass S.

The gas generant 3 is protected by the cushioning members 11, 12 to prevent from being pulverized by vibration. The cushioning member 11 contacting with the gas generant 3 has a cross notch formed to steadily transmit force of the flame spurted from the igniter 5 serving as the igniter device I to the gas generant 3 without fail and delay. Also, an enhancer agent 26 formed in a ring shape is arranged around the cushioning member 11. The enhancer agent 26 works to enhance the force of the flame generated by ignition of the igniter 5 to ensure the ignition of the gas generant 3. Elastic material, such as silicon rubber and silicon foam, is preferably used for forming the cushioning members 11, 12.

The supporting member 10 may be formed from expanded metal, punching metal, and the like. A plurality of expanded metals and the like laminated in layers may be used as the supporting member 10, as long as a number of gas flow passes for allowing the passage of the gas are ensured in that lamination. As a substitute for the expanded metal, woven metal wire may be used or may not be used. The supporting member having a ring shape or a shape shown in FIG. 4 may be used, as mentioned later.

An electric igniter that ignites when an electric current is applied to it is preferably used as the igniter 5 forming the igniter device 1. The igniter 5 is inserted in the holder 13 from an inside of the combustion chamber 2 and is secured in the holder 13 at the one end portion of the housing 1. It also extends through the cushioning member 12, projecting towards the combustion chamber 2. This igniter 5 ignites when an electric current is applied to it in accordance with collision signals from collision sensors, then letting the flames spurt into the combustion chamber 2 to forcibly ignite the gas generant 3.

Next, operation of the gas generator P1 is described with reference to FIG. 1. It is to be noted that the gas generator P1 shown in FIG. 1 is connected directly or indirectly to an interior of the buckle of the seatbelt at the other end 9 side of the housing 1.

When automobile collision is detected by the collision sensor, the generator P1 forces the igniter 5 to ignite by the application of electric current to it, as shown in FIG. 1. Then, the flame of the igniter 5 bursts and punctures the cushioning member 11. Then, the force of the flame is enhanced by the enhancer agent 26 arranged around the cushioning member 11, forcing the gas generant 3 in the combustion chamber 2 to ignite and burn. As a result of this, high temperature gas is generated. The ignition and burning of the gas generant 3 is propagated from the one end portion of the housing 1 toward the filtering member 4 sequentially.

When the burning of the gas generant 3 in the combustion chamber 2 proceeds and an interior pressure of the combustion chamber 2 rises up to a predetermined level, the high temperature gas generated in the combustion chamber 2 flows into the filtering member 4 along an axial direction of the housing 1. After the high temperature gas is filtered for slag collection and also cooled down in the filtering member 4, it turns into clean gas. Then, the clean gas passes through the supporting member 10 of the filtering member 4 and then through the gas discharge cylinder 7 and is discharged from the gas discharge hole 6. When passing through the gas flow pass S in the interior of the gas discharge cylinder 7, the gas is cooled down further by the coolant 21 set around the inner wall of the gas discharge cylinder 7. The remaining slag in the gas that was not collected by the filtering member 4 is collected by adhesion to the coolant 21 set in the interior of the gas discharge cylinder 7. Further, the gas passing through the gas flow pass S is further reliably cooled down and filtered for slag collection by the second filtering member 19 set in front of the gas discharge hole 6.

Thus, the fully cooled clean gas discharged from the gas discharge hole 6 is introduced directly into an interior of the seatbelt of the air-belt to force the seatbelt of the air-belt to expand instantaneously. The gas discharge cylinder 7 is not necessarily arranged centrically to the outer cylinder 8. It may be arranged eccentrically to the outer cylinder 8 or may be formed to correspond to the shape of the buckle of the seatbelt in which the gas generator is contained.

Figure 2:
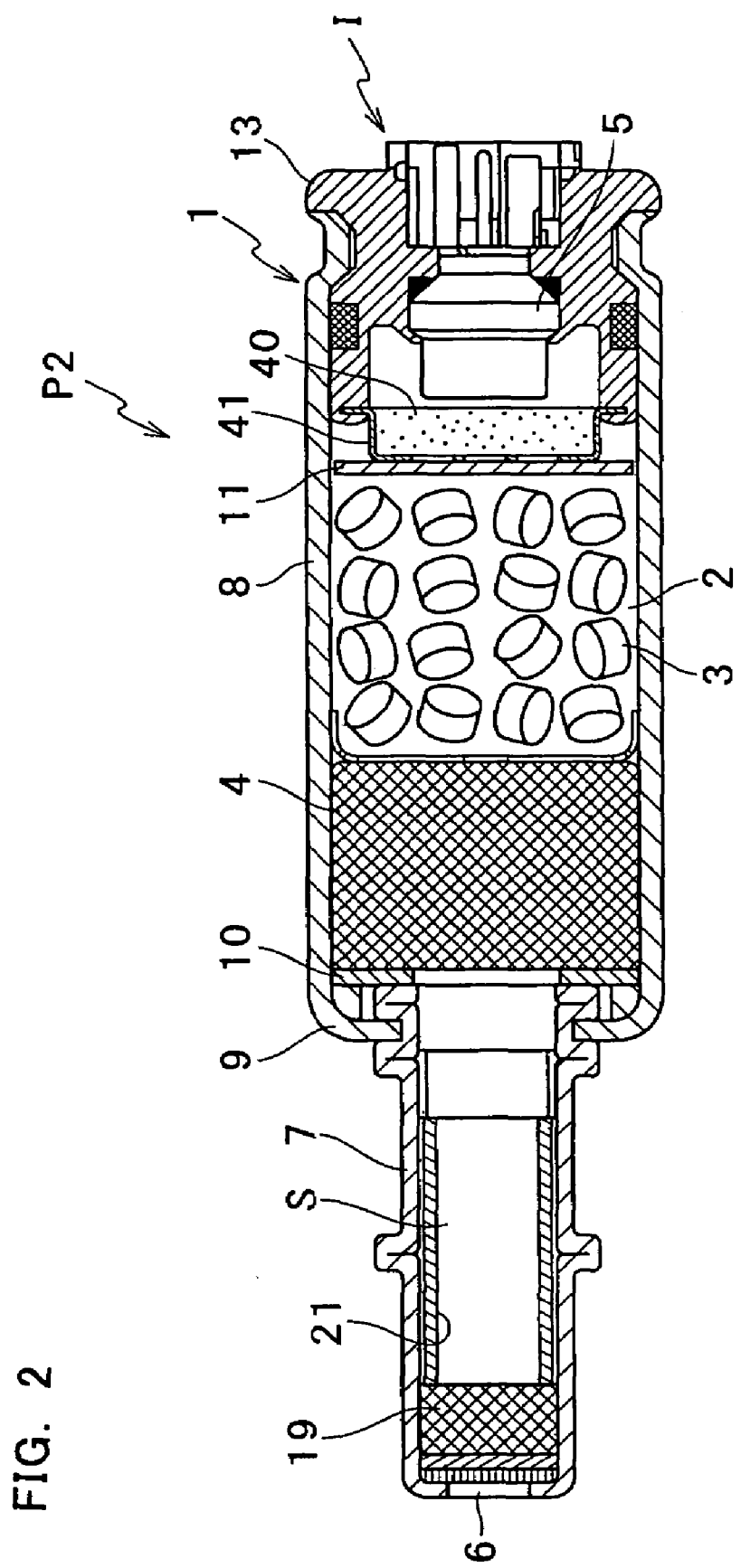
FIG. 2 a sectional view of a gas generator of a second embodiment of the present invention.

Referring now to FIG. 2, a second embodiment of a gas generator according to the present invention will be described. Sown in FIG. 2 is a sectional view of a gas generator P2 of the second embodiment of the present invention. The same reference numerals/characters refer to corresponding parts to those of the gas generator P1 shown in FIG. 1, though detailed description thereon is omitted.

The gas generator P2 according to this embodiment differs from the gas generator P1 according to the first embodiment described above in the igniter device I secured at the one end portion of the housing 1 and the supporting member 10 secured in the interior of the other end portion 9 of the housing 1.

The igniter device I according to this embodiment comprises the holder 13 for holding the igniter 5 and the storage casing 41 for storing the enhancer agent 40 held together with the igniter 5 by the holder 13. The igniter device I is secured in the one end portion of the housing 1.

Figure 3:
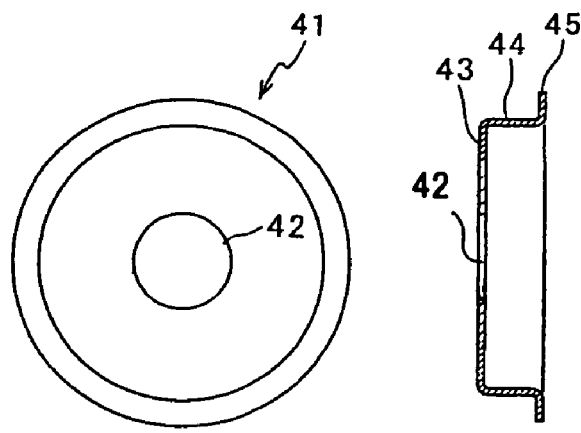
FIG. 3 is a schematic illustration of a storage casing 41 for enhancer agent 40 of FIG. 2.
Figure 3:
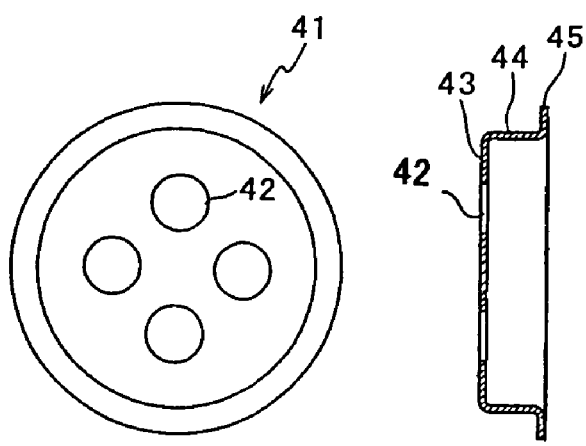
Figure 3:
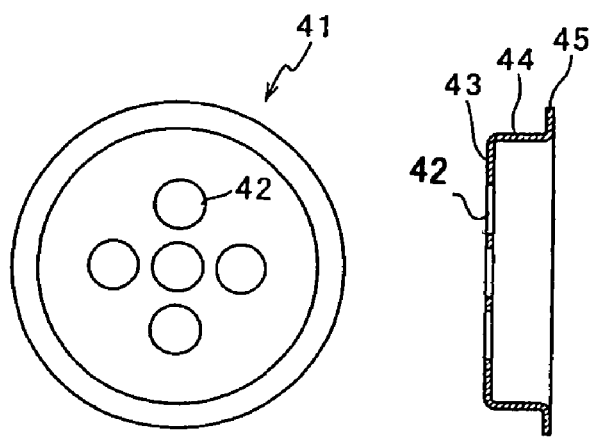

The storage casing 41 for storing the enhancer agent 40 is formed of iron having excellent heat conducting properties. As shown in FIG. 3, the storage casing 41 comprises a bottom plate 43 having one or more holes 42, a side cylindrical portion 44 extending continuously from the bottom plate 43 in a cylindrical shape, and a flanged portion 45 extending vertically from the side cylindrical portion 44 in a plane direction. Since the storage casing 41 is formed of iron having good heat conducting properties and thus has good conductivity of thermal energy from the enhancer agent 40, it can provide the effective burning of the gas generant 3 packed in the combustion chamber 2. For comparison, a conventional storage casing formed of aluminum is low in strength, so that it is burst easily by the thermal energy from the enhancer agent 40. Due to this, the conventional aluminum storage casing involves a possible fear that the direction for the thermal energy from the enhancer agent 40 to be radiated is variable and unstable. In contrast, the storage casing formed of iron higher in strength than the conventional one can provide the advantage that the hole(s) formed in the storage casing can make stable the direction for the thermal energy from the enhancer agent 40 to be radiated. This can ensure that the thermal energy from the enhancer agent 40 is oriented to the interior of the combustion chamber 2, and as such can allow further efficient burning of the gas generant 3.

It is preferable that the number of the holes 42 formed in the bottom plate 43 is in the range of 1–6 and the diameter of the same is in the range of 2–12 mm. Also, it is preferable that the amount of the enhancer agent 40 packed is in the range of 0.1–0.6 g.

Figure 4:
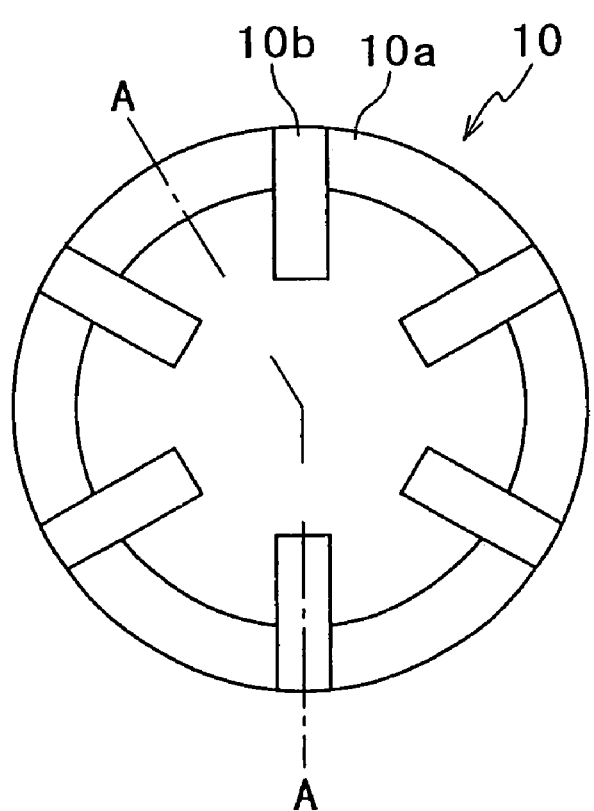
FIG. 4 is a view showing a supporting member 10 of filtering member 4 of FIG. 2.
Figure 4:
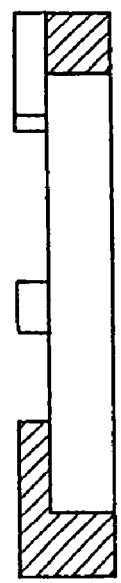

The supporting member 10 comprises, for example, a first member 10a having a ring shape, and a plurality of second members 10b each having a bar shape projecting from the first member 10a toward a center thereof, as shown in FIG. 4. The second members 10b abut with the filtering member 4 to support it. This construction of supporting the filtering member 4 by combination of the first member 10a of the ring shape and the second members 10b of the bar shape, rather than by the first member 10a only, can provide the advantage that even when the pressure in the interior of the combustion chamber 2 rises and thereby the filtering member 4 is deformed, the flow of gas can be ensured to allow the gas to pass through the filtering member 4 smoothly, thus making efficient use of the filtering member 4. The second members 10b of the supporting member 10 preferably have a bar-like shape. This is because spaces required for forming the gas flow pass can be defined between the bars, making efficient use of the filtering member 4. If the spaces between these bar-shaped portions are filled up to form a ring-like portion with no space formed therein, no such effects are obtained. It is preferable that two or more bar-shaped second members 10b of the supporting member 10 are formed, or preferably six, in easiness for forming and stable support of the filtering member 4.

Figure 5:
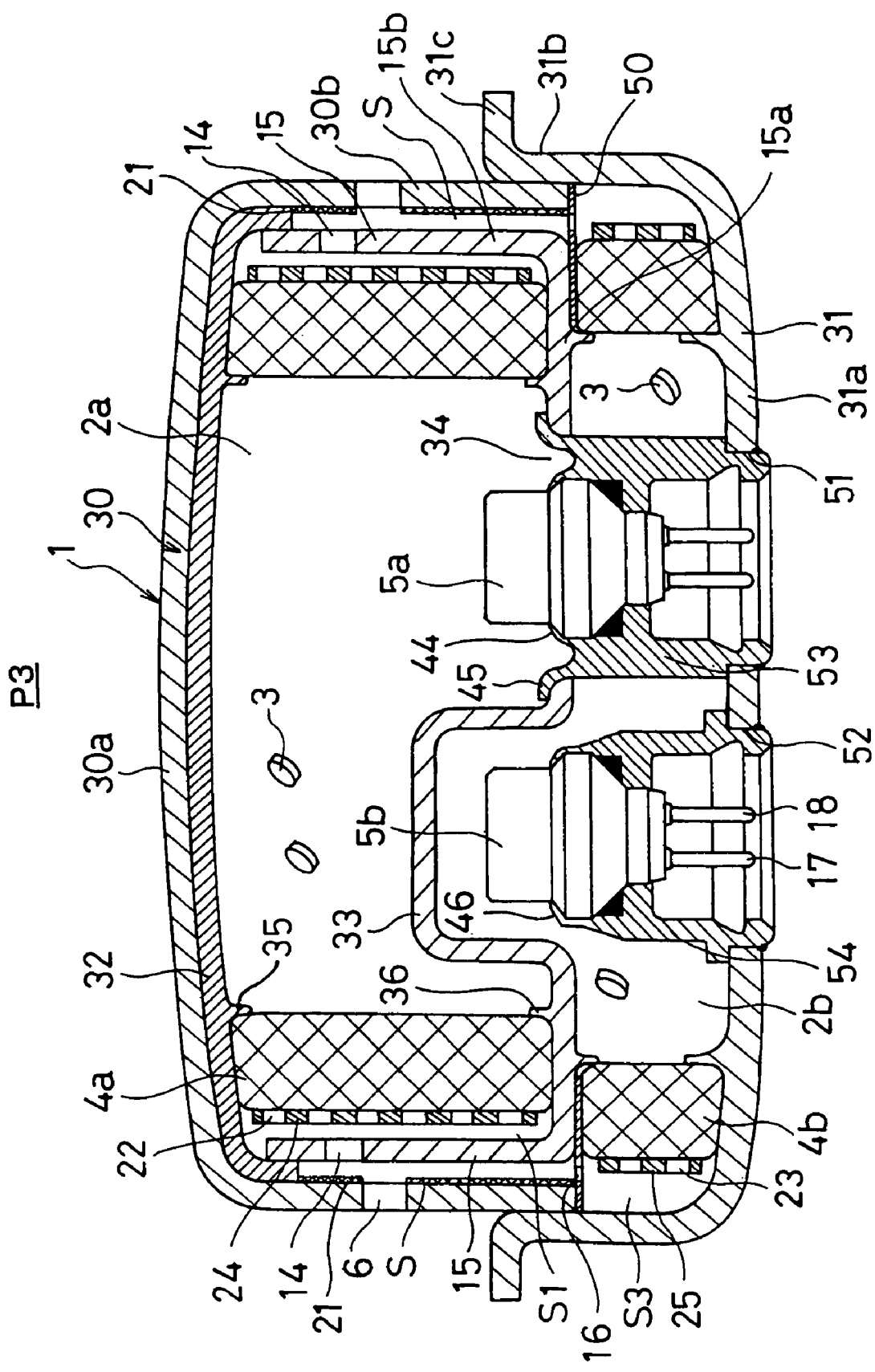
FIG. 5 is a sectional view of a gas generator of a third embodiment of the present invention.

Referring now to FIG. 5, a third embodiment of a gas generator according to the present invention will be described. Shown in FIG. 5 is a sectional view of a gas generator P3 of the third embodiment of the present invention. The same reference numerals/characters refer to corresponding parts to those of the gas generators P1 and P2 shown in FIGS. 1 and 2, though detailed description thereon is omitted.

In FIG. 5 the gas generator P3 is designed for expanding and inflating a driver's seat airbag, comprising a short cylindrical housing 1, a partition member 15 for partitioning an inner space of the housing 1 into two upper and lower combustion chambers 2a, 2b, filtering members 4a, 4b fitted in the combustion chambers 2a, 2b, respectively, igniters 5a, 5b for igniting generants 3 packed in the respective combustion chambers 2a, 2b independently, and inner cylindrical members 24, 25 supporting the filtering members 4a, 4b and having a plurality of gas passage holes 22, 23 for the combustion gas from the gas generant 3 to pass through.

The housing 1 has a closed structure wherein an upper casing 30 and a lower casing 31 are joined together by welding.

The upper casing 30 has a cup-like shape comprising a cover portion 30a and a side cylindrical portion 30b. It also has a plurality of gas discharge holes 6 formed around the side cylindrical portion 30b to open in a direction perpendicular to an axis of the housing 1. A dish-shaped cover member 32 extending along an inner surface of the cover portion 30a of the upper casing 30 is arranged in an inner portion of the cover portion 30a. The cover member 32 is welded to a partition member 15 for partitioning the interior of the housing 1 into an upper part and a lower part, to form a combustion chamber 2a. The gas flow pass S communicating with the gas discharge holes 6 is formed around the inside of the side cylindrical portion 30b of the upper casing 30. The coolant 21 is arranged around the inner wall of the side cylindrical portion 30b.

The partition member 15 has a generally cup shape. A bottom portion 15a of the partition member 15 has a protrusion 33 and an aperture 34 formed at locations eccentric to the axis of the housing 1, respectively. Also, a side cylindrical portion 15b of the partition member 15 has a plurality of orifices 14 formed along the circumferential direction. The gas flow pass S in the shape of a ring is defined between an outside of the side cylindrical portion 15b of the partition member 15 and an inside of the side cylindrical portion 30b of the upper casing 30. A circular space S1 is formed at an inside of the side cylindrical portion 15b, and an inner cylindrical member 24 and a filtering member 4a are arranged at a further inside of the circular space S1, to form a combustion chamber 2a. The gas generant 3 is packed in the combustion chamber 2a. The filtering member 4a is restrained from moving inwardly by lugs 35, 36 formed in the partition member 15 and the cover member 32, respectively. The lugs 35, 36 work to not only set the filtering member 4a in position but also let all combustion gases generated when the gas generant 3 is burnt pass through the filtering member 4a without passing through a space between the filtering member 4a and the partition member 15 and a space between the filtering member 4a and the cover member 32.

The inner cylindrical member 24 is produced, for example, by forming a porous metal sheet (punching metal) or an expanded metal sheet into a cylindrical shape. The inner cylindrical member 24 is fitted around the outside of the filtering member 4a and is extended from the partition member 15 into the vicinity of the cover member 32. The inner cylindrical member 24 has a plurality of gas passage holes 22 for allowing the gas passed through the filtering member 4a to pass through. The gas passage holes 22 communicate between the combustion chamber 2a and the space S1.

The lower casing 31 of the housing 1 comprises a lower cover portion 31a, a side cylindrical portion 31b extending from the lower cover portion 31a toward the upper casing 30, and a flanged portion 31c extending radially outwardly from the side cylindrical portion 31b. A retainer (not shown) or equivalent of an air-bag module (comprising an air-bag, a bag cover, etc.) is mounted on the flanged portion 31c. The lower cover portion 31a has apertures 51, 52 formed eccentrically to the axis of the housing 1.

A space S3 is formed at an inside of the side cylindrical portion 31b of the lower casing 31. An inner cylindrical member 25 and a filtering member 4b are arranged at a further inside of the circular space S3, and a combustion chamber 2b is formed under the partition member 15.

The inner cylindrical member 25 is produced, for example, by forming a porous metal sheet (punching metal) or an expanded metal sheet into a cylindrical shape, as is the case with the inner cylindrical member 24 mentioned above. The inner cylindrical member 25 has a plurality of gas passage holes 23 for allowing the gas passed through the filtering member 4b to pass through. The gas passage holes 23 communicate between the combustion chamber 2b and the space S3.

A partition plate 50 in the shape of a ring is interposed between the filtering member 4b and the partition member 15. The partition plate 50 contacts with an end portion of the upper casing 30 and the bottom portion 15a of the partition member 15, so that the gas flaw pass S formed in the inside of the side cylindrical portion 30b of the upper casing 30 and the space S3 formed at the inside of the side cylindrical portion 31b of the lower casing 31 are defined by the partition plate 50. The partition plate 50 has a plurality of orifices 16 formed to communicate between the gas flow pass S and the space S3.

Short inner cylinders 53, 54 are respectively placed in apertures 51, 52 formed in the lower cover portion 31a of the lower casing 31 and are secured in apertures 51, 52 by welding. The short inner cylinder 53 is also fixed to the partition member 15 by a crimping lug 45 formed in an upper portion of the short inner cylinder 53. Also, the short inner cylinders 53, 54 are fitted with the igniters 5a, 5b, respectively. The igniters 5a, 5b are fixed to the sort inner cylinders 53, 54, respectively, by crimping lugs 44, 46 formed in the short inner cylinders 53, 54.

Pin-type squibs are used as the igniters 5a, 5b herein. Each of the pin-type squibs has lead pins 17, 18 connected to external connectors, not shown, so that an electric current can be applied to a bridge circuit wire contained in the each igniter 5 to ignite ignition agent packed in the each igniter 5.

In addition to the pin-type squibs, pigtail-type squibs can be used as the igniters 5. As a substitution of the lead pins 17, 18 of the pin-type squib, the pigtail-type squibs use lead lines and gas-generator-side connectors attached to the tips of the lead lines drawn out of the housing. Through the connection of the gas-generator-side connectors to vehicle-side connectors, the squibs are connected to a control section of the gas generator (operation unit) not shown.

The gas generator P3 thus constructed is built in an airbag module secured in a steering wheel. The igniters 5a, 5b of the gas generator P3 are connected to the vehicle-side connectors, not shown, respectively and thus to the control section of the gas generator.

The control section comprises a collision sensor (acceleration sensor) for detecting automobile collision, a booster circuit to apply an electric current to the igniters 5a, 5b, a backup condenser, and a squib (igniter) drive circuit. The control section is controlled by a microcomputer.

When automobile collision is detected by the collision sensor, the gas generator P3 connected to the control section puts only the igniter 5b into operation (ignites only the igniter 5b by the application of electric current thereto) via the squib drive circuit connected to the igniter 5b to be ignited first, to ignite the gas generant 3 packed in the combustion chamber 2b, thereby generating high temperature gas.

The high temperature gas generated in the combustion chamber 2b flows into the filtering member 4b for slag collection and cooling and, then, flows into the gas passage space S3 from the gas passage holes 23 formed in the inner cylindrical member 25 and is temporarily stored in that space S3. Then, after having being dispersed uniformly in the space S3, the gas is discharged into the gas flaw pass S through the orifices 16. The gas discharged into the gas flow pass S is further cooled down by the coolant 21 arranged along the inner wall of the side cylindrical portion 30b of the upper casing 30.

Thus, the quantity of the gas discharged is controlled by letting the gas generated in the combustion chamber 2b pass through the orifices 16, thus providing a stable combustion of the gas generant 3 in the combustion chamber 2b. The control of the quantity of the gas discharged varies depending on a diameter of each orifice 16 and the number of orifices 16 formed. In addition, the temperature of the gas discharged is controlled by letting the gas generated in the combustion chamber 2b pass through the coolant 21. This can also provide the stable combustion of the gas generant 3 in the combustion chamber 2b. The control of the temperature of the gas discharged varies depending on the quantity of coolant 21.

In this stage, only the gas generant 3 in the combustion chamber 2b is burnt, so that the gas that passed through the orifices is discharged from the gas discharge holes 6 formed around the side cylindrical portion of the housing 1 uniformly into the airbag in a circumferential direction of the housing 1. As a result of this, the airbag expands and inflates moderately.

Sequentially, after the initiation of combustion of the gas generant in the combustion chamber 2b, the igniter 5a is put into operation (ignites by the application of electric current thereto) in a minimal time difference via the squib drive circuit controlled by the microcomputer of the control section. The flames from the igniter 5a are spurted into the combustion chamber 2a to burn the gas generant 3 in the combustion chamber 2a, thereby generating the high temperature gas.

The high temperature gas generated in the combustion chamber 2a flows into the filtering member 4a for slag collection and cooling and, then, flows into the gas passage space S1. Then, the gas in the space S1 flows further into the gas flaw pass S through the orifices 14 formed around the side cylindrical portion 15b of the partition member 15. The gas in the gas flow pass S is temporality stored therein to meet with the gas discharged from the combustion chamber 2b and also is cooled down further by the coolant 21 arranged along the inner wall of the side cylindrical portion 30b. Thereafter, the gas thus cooled is discharged from the gas discharge holes 6 formed around the side cylindrical portion 30b of the housing 1 uniformly into the airbag in a circumferential direction of the housing 1. As a result of this, the airbag is rapidly expanded and inflated by a large amount of fully cooled clean gas discharged from the respective combustion chambers 2a, 2b.

Thus, the airbag begins to expand and inflate moderately in the initial stage of inflation by a controlled amount of gas generated in the combustion chamber 2b and discharged through the orifices 16. Then, in a minimal time after that, the gas generated in the combustion chamber 2a and the gas generated in the combustion chamber 2b flow into each other in the gas flow pass S and also cooled down further and thereafter discharged from the gas discharge holes 6.

Although the operation mode of the igniters 5a, 5b that the igniter 5b is operated first has been described above, the igniter 5a may be operated first. Further, operation of the respective igniters in a minimal time difference is not indispensable. The operation mode of the respective igniters 5a, 5b may be properly selected depending on the automobile collision pattern.

For example, in the case of the collision of a high level of risk, such as a frontal clash or a head-on collision at high speed, the igniters 5a, 5b are operated (ignited by the application of electric current thereto) simultaneously to rapidly expand and inflate the airbag by a large amount of gases generated in the both combustion chambers 2a, 2b.

In the case of the collision of an intermediate level of risk, the igniters 5a, 5b are operated (ignited by the application of electric current thereto) in a minimal time difference so that the airbag can be expanded and inflated moderately by a small amount of gases in the initial stage of inflation of the airbag, first, and, very shortly thereafter, it can be expanded and inflated rapidly by a large amount of gases.

Further, in the case of the collision of a low level of risk, for example only the igniter 5b is operated (ignited by the application of electric current thereto) to gradually expand and inflate the airbag in a moderate manner by a small amount of gases for a relatively long time.

In the gas generator according to this embodiment, since a quantity of gas generated is adjusted by selecting the operation pattern of the igniters 5a, 5b (ignition by the application of electric current to the igniters), a controlled expansion and inflation of the airbag can be achieved. Also, since a quantity of gas discharged is controlled by a plurality of orifices 14, 16 formed in the combustion chambers 2a, 2b and also since the gas is stored in the gas flow pass S for a while, so that it is cooled down further by the coolant 21 before discharged into the airbag, a uniform amount of fully cooled gas can be discharged.

It is to be noted that the gas generator of the present invention is not limited to any of the embodiments described above.

Capability of Exploitation in Industry

According to the gas generator of the present invention, even when the gas generator is reduced in size, the high temperature gas generated by the burning of the gas generant can be cooled down to a satisfactory extent before discharged. Particularly, the coolant arranged along the inner wall of the gas flow pass can allow the cooling of the high temperature gas to nearly the same extent that the coolant arranged to interrupt the flow of gas can, while restricting the influence on the flow of gas. Therefore, the gas generator of high safety can be produced without spoiling a degree of freedom in design of an interior of an automobile.

The invention claimed is:

1. A gas generator comprising:
a housing,
a combustion chamber formed in the housing, the combustion chamber being packed with gas generant to generate high temperature gas by burning and also having a filtering member,
an igniter device, secured in the housing, for igniting and burning the gas generant packed in the combustion chamber, and
a gas discharge hole, formed in the housing, to communicate between an interior of the housing and an exterior of the same through the combustion chamber and a gas flow pass, wherein the housing has an elongated cylindrical shape, and wherein one end portion of the housing is fitted with the igniter device and a gas discharge cylinder having the gas discharge hole at a tip thereof is formed at the other end portion of the housing,
the gas generator further comprising a metal hollow cylindrical coolant arranged along an inner wall of the gas discharge cylinder to surround the gas flow pass.

2. The gas generator as set forth in claim 1, wherein the igniter device comprises an igniter and a holder for holding the igniter, and wherein the holder holds the igniter and a storage casing for containing enhancer agent to enhance flames from the igniter, the storage casing being formed of iron.

3. The gas generator as set forth in claim 1, wherein the filtering member is disposed in abutment with a supporting member arranged at the other end portion of the housing.

4. The gas generator as set forth in claim 3, wherein the supporting member comprises a first member having a ring shape, and a plurality of second members each having a bar shape projecting from the first member toward a center thereof, the second member being in abutment with the filtering member.

5. The gas generator as set forth in claim 1, wherein a second filtering member is fitted in the gas flow pass at an inside of the gas discharge hole 6 at the tip of the gas discharge cylinder.

6. The gas generator as set forth in claim 1, wherein temperature of the gas discharged from the gas discharge hole can be adjusted by adjusting a length of the gas discharge cylinder.

7. The gas generator according to claim 1, wherein the coolant is configured to create a larger surface area in the gas flow pass.

8. The gas generator according to claim 1, wherein the coolant is formed from a knitted wire sheet.

9. The gas generator according to claim 1, wherein the coolant is formed from a clean woven wire sheet.

10. The gas generator according to claim 1, wherein the coolant is formed from an aggregation of crimped metal wire rods formed into a cylindrical shape.

11. The gas generator according to claim 1, wherein the coolant is formed from an expanded metal sheet.

12. The gas generator according to claim 1, wherein the coolant is formed from a punching metal sheet formed into a cylindrical shape.

* * * * *